United States Patent [19]

Natterer

[11] Patent Number: 5,056,292
[45] Date of Patent: Oct. 15, 1991

[54] VACUUM CHAMBER PACKAGING MACHINE

[75] Inventor: Johann Natterer, Legau, Fed. Rep. of Germany

[73] Assignee: Multivac Sepp Haggenmuller KG, Fed. Rep. of Germany

[21] Appl. No.: 521,439

[22] Filed: May 10, 1990

[30] Foreign Application Priority Data

May 18, 1989 [DE] Fed. Rep. of Germany ....... 3916170

[51] Int. Cl.$^5$ .............................................. B65B 31/02
[52] U.S. Cl. ........................................ 53/86; 53/373.4
[58] Field of Search .................. 53/86, 167, 372, 403, 53/405, 434, 479, 511, 512; 83/99

[56] References Cited

U.S. PATENT DOCUMENTS

| | | | |
|---|---|---|---|
| 2,913,863 | 11/1959 | Sylvester et al. | 53/372 |
| 3,597,897 | 8/1971 | Gerard | 53/86 X |
| 3,699,742 | 10/1972 | Giraudi | 53/86 |
| 3,832,824 | 9/1974 | Burrell | 53/86 X |
| 3,958,391 | 5/1976 | Kujubu | 53/442 X |
| 4,164,111 | 8/1979 | Di Bernardo | 53/86 X |
| 4,189,897 | 2/1980 | Ailey Jr. et al. | 53/372 X |
| 4,457,122 | 7/1984 | Atkins et al. | 53/512 X |

FOREIGN PATENT DOCUMENTS

| | | |
|---|---|---|
| 0273066 | 7/1988 | European Pat. Off. . |
| 2713896 | 10/1977 | Fed. Rep. of Germany . |
| 2750934 | 5/1978 | Fed. Rep. of Germany . |
| 3151464 | 11/1982 | Fed. Rep. of Germany . |

*Primary Examiner*—Robert L. Spruill
*Assistant Examiner*—Daniel B. Moon
*Attorney, Agent, or Firm*—Donald Brown

[57] ABSTRACT

A vacuum chamber packaging machine for packing goods in bags, comprises a chamber having a lower chamber part and an upper chamber part which is movable relative to the lower chamber part. The bag is hermetically closed by generating a seal joint. Cutting means are provided for severing the bag collar projecting beyond the seal joint. Means for supplying blow air into the chamber and an opening for blowing the severed bag collar out of the chamber are provided for removing the severed bag collar from the chamber.

11 Claims, 3 Drawing Sheets

VACUUM CHAMBER PACKAGING MACHINE

BACKGROUND OF THE INVENTION

The invention relates to a vacuum chamber packaging machine including a chamber for receiving a bag containing the product to be packed, the chamber comprising a lower chamber part and an upper chamber part which is movable relative to the lower chamber part.

The bag containing the products to be packed is put into the chamber of the vacuum chamber packaging machine. The chamber is then closed and the interior of the chamber and thus also the interior of the package is evacuated. Thereafter the open end of the package is sealed and the chamber is ventilated.

In conventional vacuum chamber packaging machines the excess bag collar is either severed within the chamber machine by thermal or mechanical action and removed after opening the chamber or severed by hand later on. The severed bag collar may also be sucked out of the chamber. The discards of the bag are collected in a collecting box which must be hermetically sealed and include a suitable seperating means to prevent bag discards from reaching the suction fan.

OBJECTS OF THE INVENTION

It is an object of the invention to provide an improved vacuum chamber packaging machine. It is a further object to provide a vacuum chamber packaging machine allowing for the automatic severing and removal of an excess bag collar from the chamber. It is a still further object of the invention to provide a vacuum chamber packaging machine in which the above mentioned problems of the suction means are avoided.

SUMMARY OF THE INVENTION

In order to achieve the above mentioned objects the invention provides a vacuum chamber packaging machine comprising a chamber for receiving a bag containing products to be packed, said chamber having a lower chamber part and an upper chamber part which is movable relative to said lower chamber part, sealing means for sealing an open end of said bag, cutting means for severing an excess portion of the bag collar, a closeable first opening for removing said severed bag collar and means for supplying blow air for blowing said severed bag collar out of said first opening.

BRIEF DESCRIPTION OF THE DRAWINGS

Further advantages, features and objects of the invention will stand out from the following description of an exemplary embodiment with reference to the drawings, wherein.

DESCRIPTION OF A PREFERRED EMBODIMENT

Figure 1:
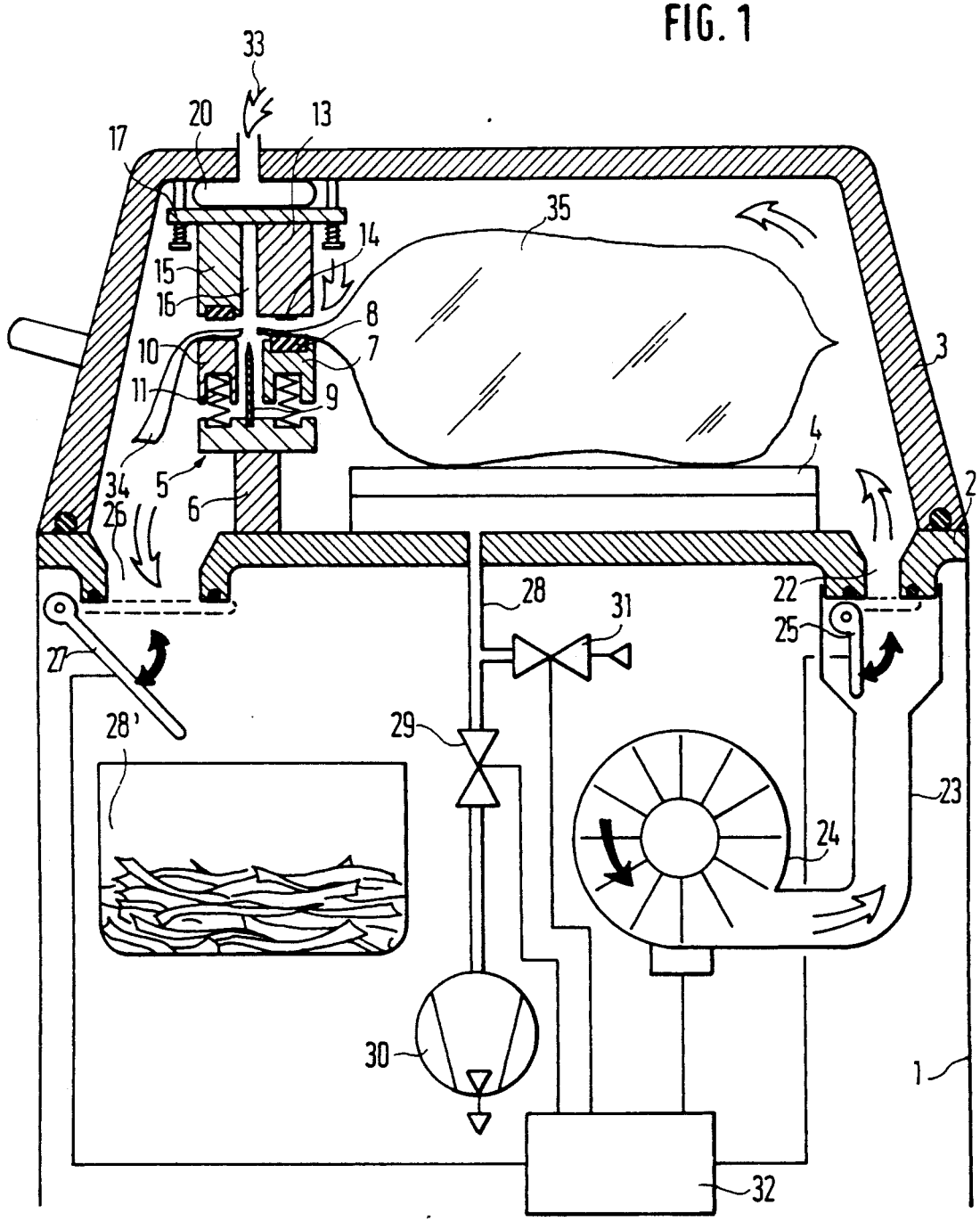
FIG. 1 is a cross-section of the vacuum chamber packaging machine according to the invention.

The vacuum chamber packaging machine comprises a frame 1 carrying a lower chamber part 2 and an upper chamber part 3. The lower and upper chamber parts are interconnected through a (not shown) joint such that the chamber can be opened by swinging out the upper chamber part for insertion of the package to be produced.

A support 4 for receiving the product to be packed is provided on the bottom of the lower chamber part. The lower member 5 of the cutting and sealing means is arranged on a side next to the support 4. The cutting and sealing means extends in the form of a beam across nearly the whole width of the interior of the chamber and comprises a lower support beam 6 which is rigidly connected to the bottom of the chamber. An abutment 7 is disposed on the beam 6 on the side thereof facing the support. The surface of the abutment facing the chamber cap is provided with a rest 8 formed of silicon rubber. Next to the abutment and on the side thereof opposite to the support 4 there is a cutter knife 9 fixedly arranged such that it extends parallel to the abutment 7 a small distance therefrom. A further abutment 10 which extends parallel to the first abutment 7 and to the cutter knife 9 is disposed on the side of the cutter knife 9 opposite to the first abutment 7. Both abutments 7, 10 are supported by springs 11, 12 in the manner shown in the FIGS. 1 and 3 such that they are held in such a distance above the beam 6 that the cutter knife 9 disposed between both abutments is completely immersed in the channel formed between both abutments.

A beam 13 having a sealing member 14 opposite to the rest 8 is arranged in the interior of the upper chamber part 3 at a place opposite to the abutment 7. An upper press-down member 15 is provided in a distance from the beam 13 and opposite to the abutment 10. Beam 13 and upper press-down member 15 are mounted on a common plate 17 which is guided by guide means mounted to the upper chamber part and biased into the retracted position shown in FIGS. 1 and 3 by means of springs 18, 19. A pneumatic drive formed as diaphragm means 20 is provided between the upper chamber part and plate 17. When supplied with pressurized medium the pneumatic drive displaces the beam 13 and the upper press-down member 15 in the direction of arrow 21 shown in FIG. 3 towards the two abutments 7, 10 such that these are pressed down against the action of the springs 11, 12 towards the lower beam 6 to such an extent that the cutter knife 9 emerges from the gap and enters into the interspace 16 between the beam 13 and the upper pressdown member 15. The position and the width of the interspace 16 are selected so that the knife may easily enter.

An opening 22 is provided between the support 4 and the edge of the chamber at the end thereof opposite to the cutting and sealing means. The opening is connected to a blower 24 through a connecting conduit 23. Shut-off means 25 formed as a pivotable flap or butterfly valve is provided between the blower and the opening for closing or clearing the opening, respectively. A further opening 26 is provided on the opposite side of the chamber between the lower beam 6 and the edge of the chamber. Shut-off means 27 formed as a pivotable flap or a butterfly valve are arranged at the exit side of the opening 26 for closing or clearing the same, respectively. A container 28' for receiving the severed bag discards is disposed underneath the opening 26. Furthermore, the interior of the chamber can be connected through a conduit 28 either with a vacuum pump 30 through a valve 29 or with the surrounding atmosphere through a valve 31. Finally a control unit 32 is connected to the valves 29, 31, the blower 24, the two shut-off means 25, 27 and the supply 33 for the operating medium for the diaphragm means 20.

In operation the products to be packed are put into a bag. The chamber is opened by opening the upper chamber part and the bag having the products therein is put into the chamber in the manner shown in FIG. 1 such that the projecting bag collar rests on the rest 8 of the abutment 7 and on the abutment 10. Thereupon the upper chamber part is moved into the closing position of the chamber shown in FIG. 1 and the interior of the chamber is evacuated through the vacuum pump 30. When a predetermined pressure in the interior of the chamber has been reached the diaphragm means 20 is operated by pressurized air such that the beam 13 and the upper press-down member 15 are pressed downwards in the direction of arrow 21 against the force of the springs 18, 19 and they act on the bag collar to fix the same. The continued downward pressure in the direction of the arrow 21 moves the abutments 7, 10 against the action of the springs 11, 12 into the retracted position towards the lower beam 6. The sealing bar 14 receives a voltage pulse and seals the bag across the whole width thereof in the manner best shown in FIG. 2 and thereby hermetically closes the bag. At the same time the cutter knife 9 penetrates from the interspace between the two abutments 7, 10 towards the interspace 16 and thereby cuts off the protruding bag collar 34.

Figure 3:
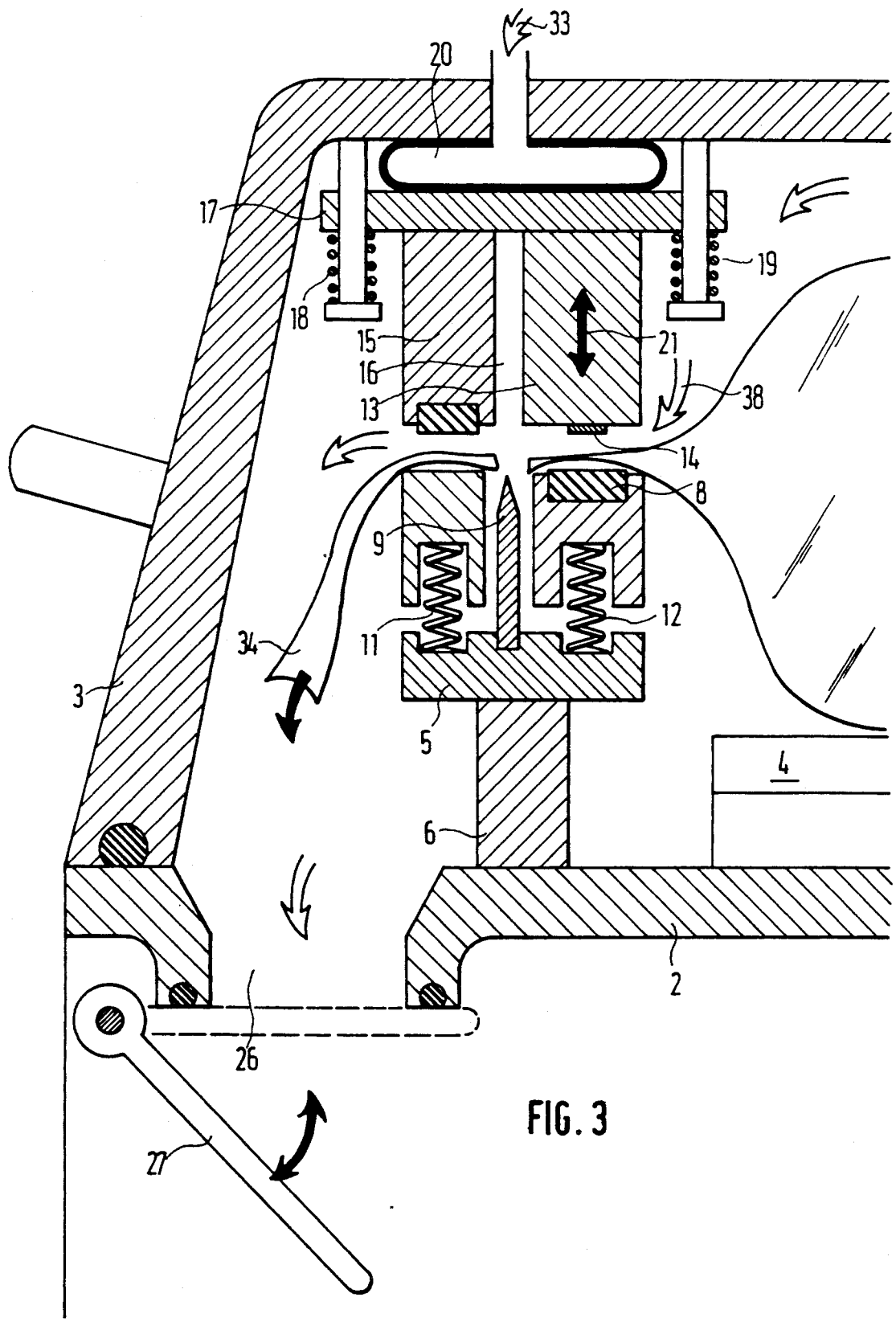
FIG. 3 is a sectional representation of a part of the vacuum chamber packaging machine of FIG. 1 on an enlarged scale.

Thereafter the diaphragm means 20 is again depressurized such that the beam 13 and the upper press-down member 15 are returned into the retracted positon shown in FIGS. 1 and 3. Thus the sealed bag 35 as well as the severed bag collar 34 are released. Subsequently the interior of the chamber is aerated through valve 31. As soon as ambient pressure has been reached in the interior the control unit 32 opens the flaps 25, 27 which had been in the hermetically closing position shown in FIG. 1 in dotted lines during the above described operation. At the same time the blower 24 supplies blowing air into the interior of the chamber.

Figure 2:
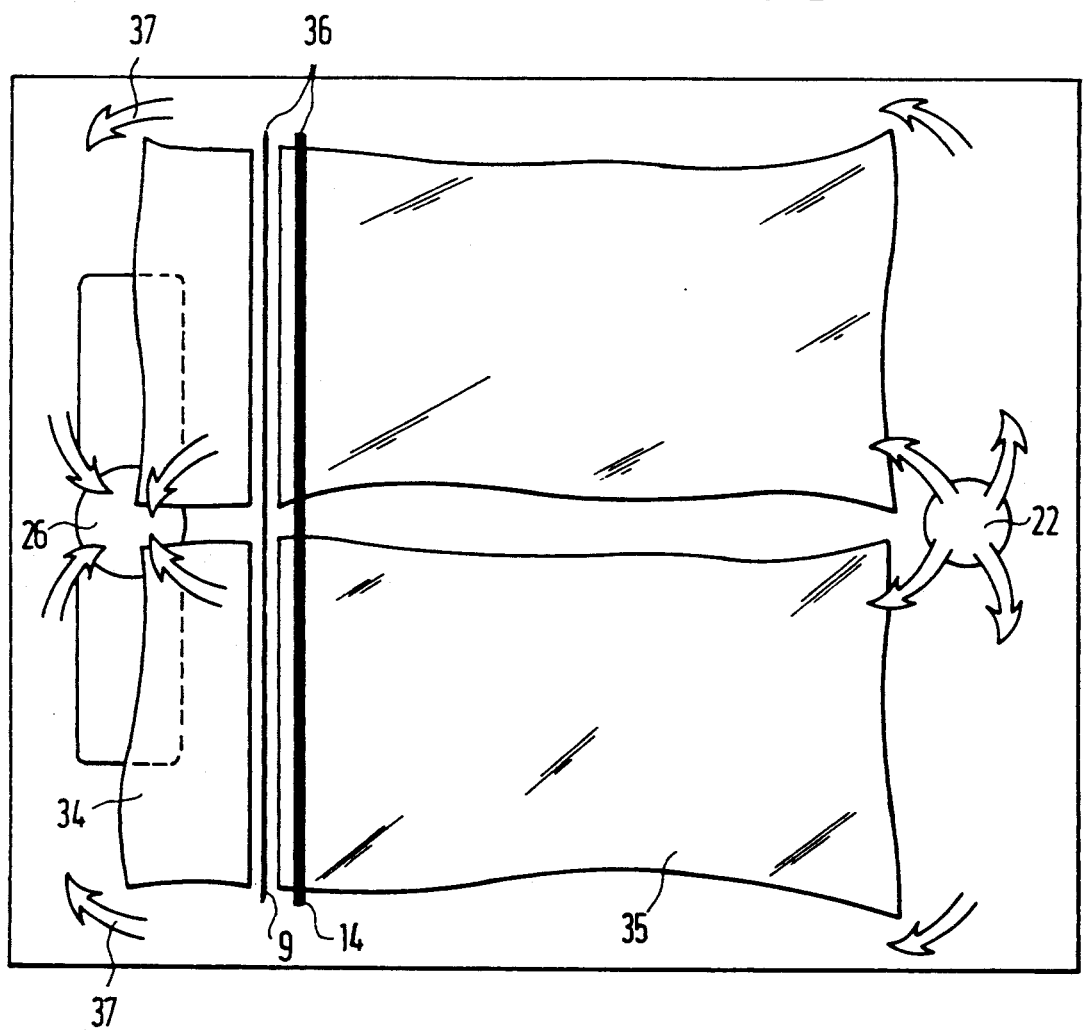
FIG. 2 is a top view of the lower chamber part with a sealed bag positioned therein and having the bag collar severed therefrom.

The dimensions of the cutting and sealing means are selected such that it extends nearly across the whole width of the chamber, as may be seen from the cutter knife 9 and the sealing bar 14 indicated in FIG. 2; in this manner a bag which extends nearly across the whole width of the chamber can be completely grasped and processed. The dimensions are however such that between the respective lateral edge 36 and the adjacent wall of the uppper chamber part a gap remains such that a lateral air stream indicated by the arrow 37 passes by and towards the opening 26. Moreover, the biasing force of beam 13 and upper press-down member 15 is selected such that a gap or space exists in the retracted position between the beam 13 and the upper press-down member 15 and the opposite abutments 7, 10 or a bag collar resting theron, respectively, such that an air stream indicated by the arrow 38 exists over the whole length of the sealing means and this air stream together with the lateral air stream indicated by the arrow 37 transports the severed bag collar 34 towards the openig 26 and therethrough into the container 28'. Therafter the pivotable flaps 25, 27 are moved back into the closed position shown in dotted lines. The finished bag is removed from the opened chamber, and the next bag to be closed is inserted and the operation repeated, if desired.

While the invention has been described in preferred form it is not limited to the precise nature shown as various modifications may be made without departing from the scope of the appended claims.

What is claimed is:

1. A vacuum chamber packaging machine comprising a chamber for receiving a bag containing products to be packed, said chamber having a lower chamber part and an upper chamber part which is moveable relative to said lower chamber part, sealing means provided in the interior of said chamber for sealing an open end of said bag, cutting means provided in the interior of said chamber adjacent to said sealing means at the side opposite to said bag received in said chamber for severing an excess portion of the bag collar, a first opening provided in the interior of said chamber at the side of said cutting means opposite to said sealing means for removing said severed bag collar, means for closing or clearing said first opening and means for supplying blow air into said chamber for blowing said severed bag collar into said first opening.

2. The vacuum chamber packaging machine of claim 1, said means for supplying blow air comprising a blower which is connected to the interior of said chamber through a closeable second opening.

3. The vacuum chamber packaging machine of claim 2, comprising a conduit having a first valve for connection of the interior of said chamber with a vacuum source and a second valve for connection of the interior of said chamber with the ambient atmosphere.

4. The vacuum chamber packaging machine of claim 3, comprising a control unit for controlling said valves, said blower and the opening and closing of said two openings.

5. The vacuum packaging machine of claim 1, wherein said sealing means comprises a first abutment and a sealing member which is movable relative to said first abutment.

6. The vacuum chamber packaging machine of claim 1, wherein said cutting means comprises a cutter knife and a second abutment and a press-down member movable relative thereto for pinching said bag collar.

7. The vacuum chamber packaging machine of claim 6, wherein said cutter knife is arranged in relation to the press-down member and to said second abutment such that it may be either in an inactive position or in an active cutting position.

8. The vacuum chamber packaging machine of claim 7, wherein said sealing means comprises a first abutment and a sealing member which is movable relative to said first abutment.

9. The vacuum chamber packaging machine of claim 8, wherein said cutter knife is stationary disposed within a channel formed by said first and second abutments being resiliently supported and moved by co-operation with said press-down member and said sealing member in such a manner that the cutter knife emerges from said channel.

10. The vacuum chamber packaging machine of claim 1, wherein said chamber comprises a chamber wall and said sealing means and said cutting means are formed as members extending transversely across the interior of said chamber and both said members are laterally surrounded by gaps extending between said chamber wall and said members, a substantially uniform air stream flowing through said gaps for transporting said severed bag collar to said first opening.

11. The vacuum chamber packaging machine of claim 1, wherein said sealing means comprises a lower first abutment and an upper beam and said cutting means comprises a lower second abutment and an upper press-down member and wherein after severing said bag collar, a gap is formed between said upper beam and said upper press-down member on the one hand and said abutments on the other hand, said gap extending across the whole width of said beam and having an air stream passing therethrough for transporting said severed bag collar to said first opening.

* * * * *